United States Patent
Swamidass (10) Patent No.: US 8,312,368 B2
(45) Date of Patent: Nov. 13, 2012

(54) DYNAMIC DOCUMENTATION (75) Inventor: Vijay E. Swamidass, Hayward, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2013 days.

(21) Appl. No.: 11/030,247

(22) Filed: Jan. 6, 2005

(65) Prior Publication Data

US 2006/0150090 A1    Jul. 6, 2006

(51) Int. Cl.
*G06F 17/00* (2006.01)
(52) U.S. Cl. .......................................... 715/230; 715/234
(58) Field of Classification Search .................. 715/500, 715/506, 511, 526, 530, 540, 230, 222, 234; 717/172; 726/5
See application file for complete search history.

(56) References Cited

U.S. PATENT DOCUMENTS

| | | | |
|---|---|---|---|
| 5,802,299 A | 9/1998 | Logan et al. | |
| 6,006,242 A | 12/1999 | Poole et al. | |
| 6,029,142 A | 2/2000 | Hill | |
| 6,182,095 B1 * | 1/2001 | Leymaster et al. | 715/515 |
| 6,212,494 B1 | 4/2001 | Boguraev | |
| 6,397,231 B1 * | 5/2002 | Salisbury et al. | 715/234 |
| 6,654,754 B1 * | 11/2003 | Knauft et al. | 707/100 |
| 6,675,353 B1 * | 1/2004 | Friedman | 715/513 |
| 6,687,557 B2 | 2/2004 | Ouchi | |
| 6,763,500 B2 * | 7/2004 | Black et al. | 715/234 |
| 6,826,726 B2 * | 11/2004 | Hsing et al. | 715/513 |
| 6,961,902 B2 * | 11/2005 | Anecki et al. | 715/222 |
| 7,253,817 B1 * | 8/2007 | Plantec et al. | 345/473 |
| 7,454,259 B2 * | 11/2008 | Ninomiya | 700/98 |
| 7,814,157 B2 * | 10/2010 | Doyle | 709/206 |
| 2001/0047369 A1 * | 11/2001 | Aizikowitz et al. | 707/500 |
| 2002/0002563 A1 * | 1/2002 | Bendik | 707/500 |
| 2002/0194226 A1 * | 12/2002 | Sheth et al. | 707/517 |
| 2003/0066028 A1 * | 4/2003 | Payne et al. | 715/500 |
| 2004/0034552 A1 * | 2/2004 | Cole et al. | 705/7 |
| 2004/0210837 A1 * | 10/2004 | Black et al. | 715/513 |
| 2005/0028091 A1 * | 2/2005 | Bordawekar et al. | 715/514 |
| 2009/0150364 A1 * | 6/2009 | Melander et al. | 707/3 |

OTHER PUBLICATIONS

Usman Dastgeer; Skeleton Programming for Heterogeneous GPU-based Systems; 2011; 107 pages; http://bluecoat-01/?cfru=aHROcDovL2xpdS5kaXZhLXBvcnRhbC5vcmcvc21hc2gvZ2VOL2RpdmEyOjQzNzEOMC9GVUxMVEVYVDAx.*
Oracle Corporation, Oracle Tutor, 2004, http://www.oracle.com/applications/tutor/index.html.

* cited by examiner

*Primary Examiner* — Doon Chow
*Assistant Examiner* — Linh K Pham
(74) *Attorney, Agent, or Firm* — Kraguljac Law Group, LLC (57) ABSTRACT

Systems, methodologies, media, computing devices, and other embodiments associated with dynamic documentation are described. One exemplary system embodiment can include a dynamic documentation system configured to dynamically generate a document using a skeleton document that includes references to content. The document can be generated by using the skeleton document and retrieving the referenced content to form a final document.

19 Claims, 5 Drawing Sheets

DYNAMIC DOCUMENTATION

BACKGROUND

In a successful operations environment of any kind, processes must be accurately documented and maintained. Example processes may include how to install a particular version of a database, how to configure a network server, how to install a software application, and the like. The documentation that describes step-by-step instructions for performing such processes is sometimes referred to as process documents and/or operations documents. Maintaining accurate process documentation can provide for consistency and quality when a process is performed, which also leads to processes being repeatable. Accurate process documentation can also provide new team members of a department with an objective point of reference from which to learn selected processes.

However, in quickly changing environments, documentation frequently is not updated and becomes inaccurate and out-of-date. Specific tasks within a process document may be left undocumented or abbreviated, which may be unclear to a reader.

A typical process document is created with a word processor and can describe a sequence of steps for performing a selected process. If the process changes, the process document would need to be modified. To complicate matters, if a particular task is modified, then all process documents that include the task must be manually changed. This becomes problematic when many process documents may exist.

Furthermore, if process documents are created to specifically define each selected process, then many process documents will need to be generated to cover all possible scenarios for the selected process. Of course, as the number of process documents increases, the difficulty in maintaining those documents increases. Conversely, if a process document is too general (e.g., tries to address too many scenarios), a reader will have to make more decisions as to how to perform the process which may lead to confusion and opportunities for errors.

An additional problem is that operations documents often use arbitrary, undefined variables such as <customer>, {STDATE}, or $SR to indicate values which change based on the particular project. Readers may choose incorrect values for these variables, which leads to confusion about the document and errors when executing the process.

BRIEF DESCRIPTION OF THE DRAWINGS

The accompanying drawings, which are incorporated in and constitute a part of the specification, illustrate various example systems, methods, and so on that illustrate various example embodiments of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Of course, embodiments and/or elements can be combined with other embodiments to produce variations of the systems and methods, and their equivalents.

DETAILED DESCRIPTION

Example systems, methods, computer-readable media, and other embodiments are described herein that relate to dynamic documentation. In one example, suppose a process document can be an instructional document that describes a sequence of steps that are to be performed in order to accomplish the process. One example process may be how to install a software application. In one example, the system can configure and control process documents as multiple components that can be dynamically combined to generate an actual or completed process document.

For example, content for a process can be kept separate from the process documents until requested. The content can be provided as task documents, or other type of data object, where each task document includes content that describes a specific task. A specific task may be for example, how to log into a network, how to verify a software version, how to set up a database hot backup, how to format an email that notifies customers of a product release, or other desired task. The task documents can then be used as building blocks to create a process document. The process document can order the tasks, creating a sequence of instructions for accomplishing the process.

Many process documents can share task documents since many processes may involve common tasks. If a task changes, its corresponding task document can be modified. As a result, all process documents that use it as a building block will also be automatically modified when the process document is dynamically generated. As such, maintenance of the process documentation can be simplified since a modification to one task document can automatically update multiple process documents.

The following includes definitions of selected terms employed herein. The definitions include various examples and/or forms of components that fall within the scope of a term and that may be used for implementation. The examples are not intended to be limiting. Both singular and plural forms of terms may be within the definitions even when only a singular term is used.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, optical or magnetic disks, dynamic memory and the like. Transmission media may include coaxial cables, copper wire, fiber optic cables, and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, a carrier wave/pulse, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device like a field programmable gate array (FPGA), a memory device containing instructions, combinations of logic devices, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. In the context of a network connection, an operable connection may be created though one or more computing devices and network components. Logical and/or physical communication channels can be used to create an operable connection.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a client. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of methods, algorithms, and/or symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, intercepting, storing, redirecting, detecting, determining, displaying, or the like, refer to actions and processes of a computer system, logic, processor, or similar electronic device that manipulates and/or transforms data represented as physical (electronic) quantities.

Figure 1:
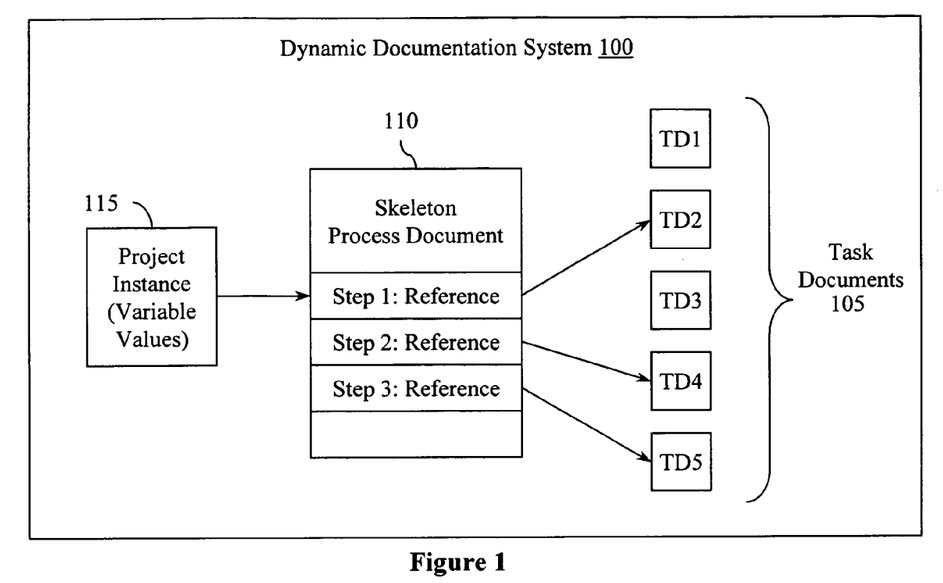
FIG. 1 illustrates an example block diagram that shows how one embodiment of a dynamic documentation system may configure process documents.

Illustrated in FIG. 1 is one embodiment of an example dynamic documentation system 100 that can be used to generate process documents and provide maintenance to process documents. The system 100 is shown as a logical block diagram that illustrates how a process document can be configured and controlled by the system 100. For purposes of explanation, a process document will be referred to as an electronic document or file that describes a particular process/operation. The process document can include, for example, an ordered sequence of steps and/or instructions that describe how to perform a process.

In one example, the system 100 can be configured to generate and maintain individual units of content that can be selectively combined to form a process document. The content can be part of library or other form of data store. For purposes of explanation, the units of content will be described as a set of task documents 105 where each task document describes a specific task that can be used as a step or sub-step within a process document. The task documents 105 can be regarded as building blocks that can be selectively used to generate a desired process document. Although five task documents (TD1-TD5) are shown, other amounts can be implemented.

To define a process document, a skeleton process document 110 can be generated. The skeleton process document 110, in one form, is a stripped version of the actual process document in that it can define the steps that are involved in the process but the actual content for each step is not included. Rather, the skeleton process document 110 is more like an outline or table of contents and includes references associated with each step that refer to a task document from the set of task documents 105.

For example, the skeleton process document 110 is shown with three steps where step 1 includes a reference to task document TD2, step 2 includes a reference to task document TD4, and step 3 includes a reference to task document TD5. Each reference may be, for example, a document identifier, a link, an address, a file name, or other object that can facilitate locating and retrieving a task document. By separating the content (e.g., the task documents) from the skeleton document 110, maintenance of the content and the resulting process documents can be improved.

For example, since the content of a specific task is maintained in one location as a task document, modifying the task would only include modifying its task document. Since skeleton process documents are configured to only refer to content rather than actually including the content, modifications to each skeleton process document can be avoided. Thus, if ten different skeleton process documents refer to task document TD2, a modification to the task document TD2 will be automatically applied to each process document once the process document is dynamically generated, which will be described in greater detail below.

In another embodiment, one or more of the task documents 105 can be configured with variables that allow the skeleton process document 110 to be used by multiple projects and be customizable for each particular project. For example, a project instance 115 can be generated for a particular instance of a process. The project instance 115 can be, for example, a document, file, or other object that contains information about a selected process. The project instance 115 may include one or more values for variables that the documentation system 100 will insert into the corresponding variables within task documents that are used by the skeleton process document 110.

As an example, suppose that the skeleton process document 110 defines a set of steps for installing an Oracle 9i database. Further suppose that the Oracle 9i database is to be installed for two different customers, customer ABC and customer XYZ. A project instance 115 can be defined for each customer that identifies information to be used by the documentation system 100 when dynamically generating a process document for the project. For example, the information can identify the skeleton process document to be used for the project, one or more values for variables that can be substituted into corresponding variables in the task documents 105, or other desired information relating to the project.

Thus, suppose that the task document TD2 includes a variable for "customer name". The project instance 115 can include a value such as "ABC Company" for the variable "customer name." A different project instance can be created that also uses the skeleton document 110 but includes a value "XYZ Company" for the variable "customer name." When the system 100 dynamically generates a process document by combining the skeleton process document 110 and the referenced task documents 105, values from the project instance 115 can be inserted. Thus, a customized process document can be created for each customer even though it is created using the same skeleton document 110 and task documents 105. Of course, one of ordinary skill will appreciate that many other types of variables can be used within the task documents 105. In this manner, the use of variables may facilitate customizability of the task documents 105 and ultimately a process document for a particular project.

Figure 2:
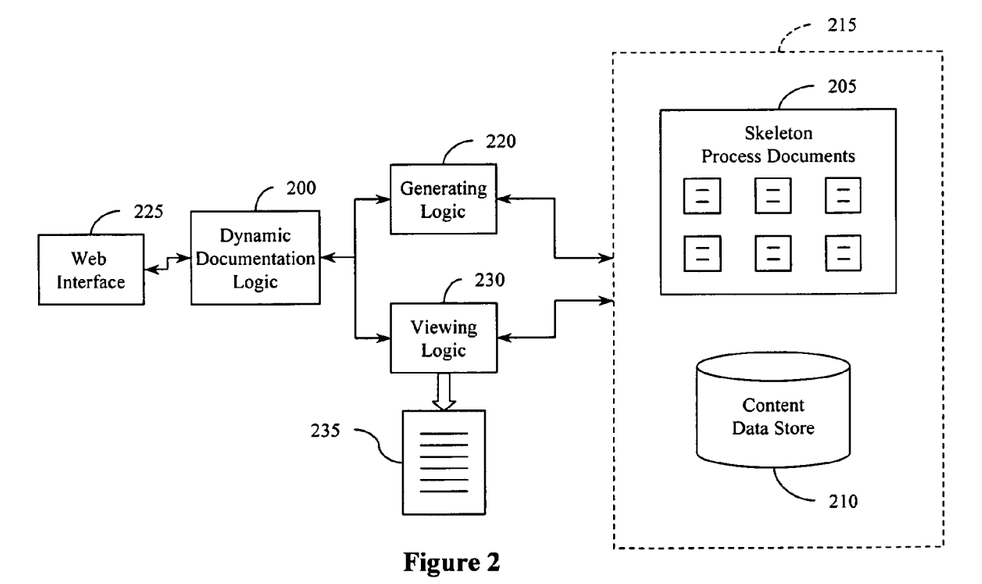
FIG. 2 illustrates an embodiment of a dynamic documentation logic that can dynamically generate process documents.

Illustrated in FIG. 2 is an example embodiment of a dynamic documentation logic 200 that can be configured to generate skeleton process documents 205, and configured to dynamically generate a process document in response to a request to view the process document. The request to view can include requests to display, print, transfer (e.g., by email), or process the document in other desired ways. Each skeleton document 205 can be similar to the skeleton process document 110 shown in FIG. 1. In general, each skeleton document 205 can be an outline of a process document that includes references to content rather than containing the content itself.

Additionally, a content data store 210 can be maintained that represents content to be used by the skeleton process documents 205. For example, the content can include a set of task documents that can be similar to the task documents 105 shown in FIG. 1. The skeleton process documents 205 and content data store 210 can be maintained in a storage location represented by outline 215, which can include a common storage location, multiple storage locations, storage locations on multiple devices, or other desired storage configurations. In general, the dynamic documentation logic 200 is configured to access the skeleton process documents 205 and the content data store 210 regardless of their location and/or manner of storage.

In one embodiment, a process document can be defined to describe a sequence of steps for performing a selected process. To initially create the process document, a generating logic 220 can be provided that is configured to generate the process document by using a skeleton document and a plurality of task documents. As described with reference to FIG. 1 previously, the skeleton process document can include a plurality of steps for performing the selected process where the steps include references to task documents that are maintained in the content data store 210. As previously described, a task document can include instructions for performing a specific task that can be associated to a selected step in one or more skeleton process documents 205. The task documents that are part of the content data store 210 are maintained separate from the skeleton documents 205 thereby separating the content from the skeleton documents 205. Using a different analogy, a skeleton document can list chapters of a book and identify where the content for each chapter resides or provide information for locating the content.

In one embodiment, the generating logic 220 can include a word processor or other type of document generating application that can facilitate creating a file or other object that becomes a skeleton process document. The skeleton process document can be an outline of steps where the steps include references to content such as a reference to a task document in the content data store 210. The references can include document identifiers that facilitate locating and retrieving the task documents from a location in the content data store 210. For example, the document identifiers can be a file name, a link, a pointer, an alphanumeric string used as an index, and the like. When generating a skeleton process document, the generating logic 220 can be configured to display a list of available task documents that may be contained within the content data store 210. A user can then select and associate desired task document identifiers with an appropriate step within the skeleton document. To facilitate user interaction, a web interface 225 can be provided to access the dynamic documentation logic 200. The web interface 225 can be configured with a graphical user interface that provides selectable options for configuring a skeleton process document 205.

As previously described, multiple skeleton process documents 205 can be generated for different processes where the skeleton process documents 205 reference task documents from the content data store 210. In this manner, when modifications need to be made to a particular task described by a task document, the instructions contained within that task document only need to be modified. This avoids modification of each skeleton process document 205 that refers to that task document. A resulting process document will be automatically updated when its skeleton process document is built by combining the content from the task documents referenced by the skeleton process document.

The automatic updating of a process document is one result of the manner in which process documents are configured and generated. For example, a viewing logic 230 can be provided that is configured to dynamically generate a process document 235 in response to a request to view the process document. Thus, the completed or viewable process document 235 does not exist with all content until dynamically generated by building its corresponding skeleton document using the task documents referenced within the skeleton document. In one example, if a user desires to access a process document for configuring a network server, the dynamic documentation logic 200 would retrieve a skeleton process document, retrieve the task documents from the content data store 210 that are referenced in the skeleton document, and generate the final process document 235. Any changes made to the task documents since the last time the process document 235 was viewed would be automatically applied to the process document 235 each time it is viewed/generated.

In another embodiment, the task documents may include variables that can be dynamically configured. If variables are present, the viewing logic 200 can be configured to assign values to the variables when dynamically generating the process document 235. In one example, this can be accomplished by having the user identify or define a project instance, such as project instance 115 from FIG. 1, that identifies the skeleton document of a process and any desired values to be substituted for variables.

Figure 3:
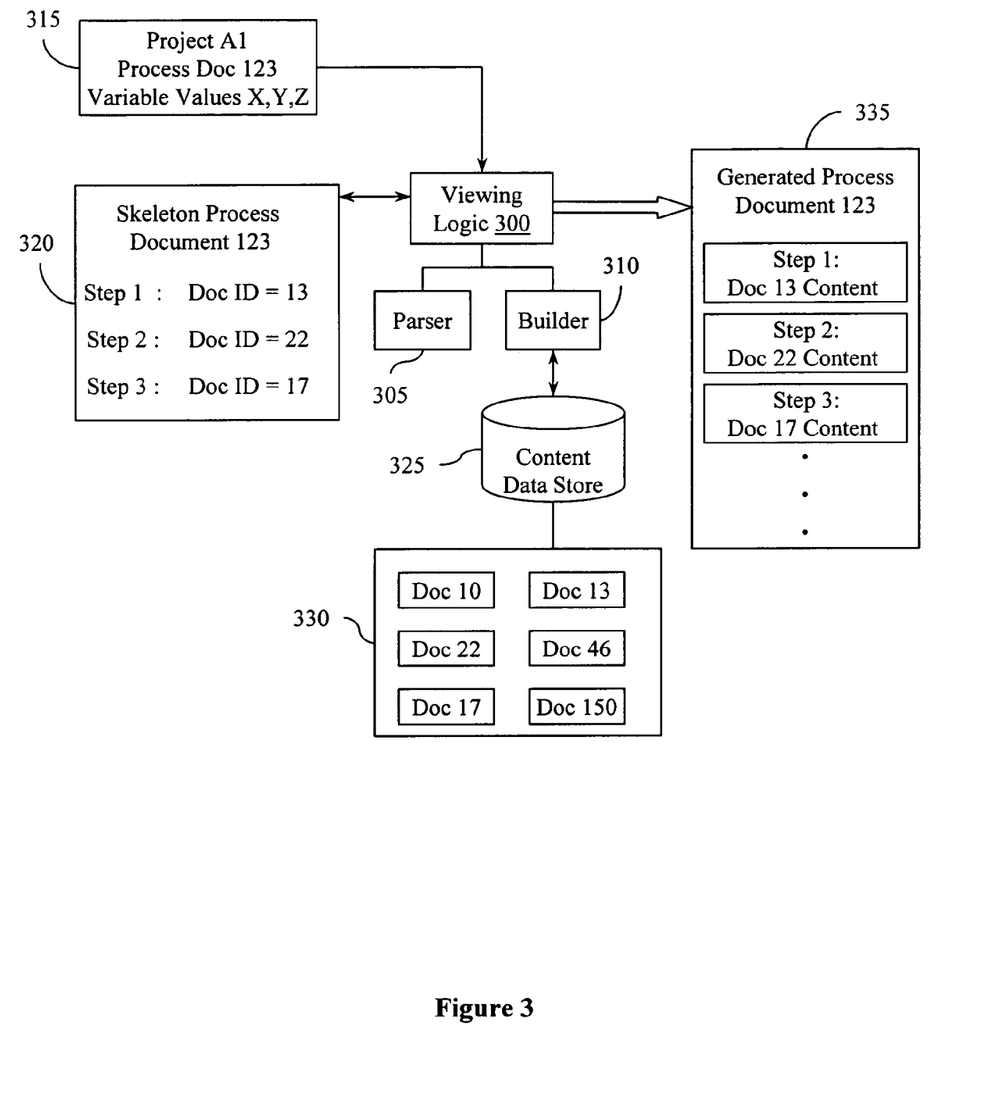
FIG. 3 illustrates an example embodiment of a viewing logic that can dynamically build a process document.

With reference to FIG. 3, one example embodiment of a viewing logic 300 is shown that may be implemented for the viewing logic 230 of FIG. 2. The viewing logic 300 can include a parser 305 and a builder 310 that will be described with reference to how they manipulate and generate a process document dynamically. For example, suppose a user wishes to view a process document for process 123 that has been created for project A1. The viewing logic 300 can receive as input a project instance 315 that identifies project A1 and process document 123. The project instance 315 may also include one or more values for variables X, Y, and Z, for example.

In response to a request to view process document 123, viewing logic 300 can identify the corresponding skeleton process document 123 (Block 320). In the example, the skeleton process document 123 includes an outline of three steps 1, 2, and 3. Each step includes a reference to a document identifier (ID) that is used to reference the content that is to appear in the corresponding step. For example, step 1 refers to Document 13 (e.g. "Doc ID=13"). Of course, other types of document identifiers and references can be used as previously described.

Once the skeleton process document 123 is identified, the parser 305 is configured to parse the document to identify any references to content (e.g., references to task documents). In the example, the parser 305 will identify document IDs 13, 22, and 17. Using the document IDs, the builder 310 can be configured to locate and retrieve the corresponding documents from a content data store 325 that contains one or more documents 330. The documents 330 can be task documents as previously described. Of course, other forms of content can be used as building blocks to build or otherwise generate a final process document 123 (Block 335). Thus, the builder 310 can combine the skeleton process document 123 with the content from the referenced documents 330. As seen in Block 335, the generated process document 123 is shown having step 1 now including the content from document 13, step 2 including the content from document 22, and step 3 including the content from document 17.

Figure 4:
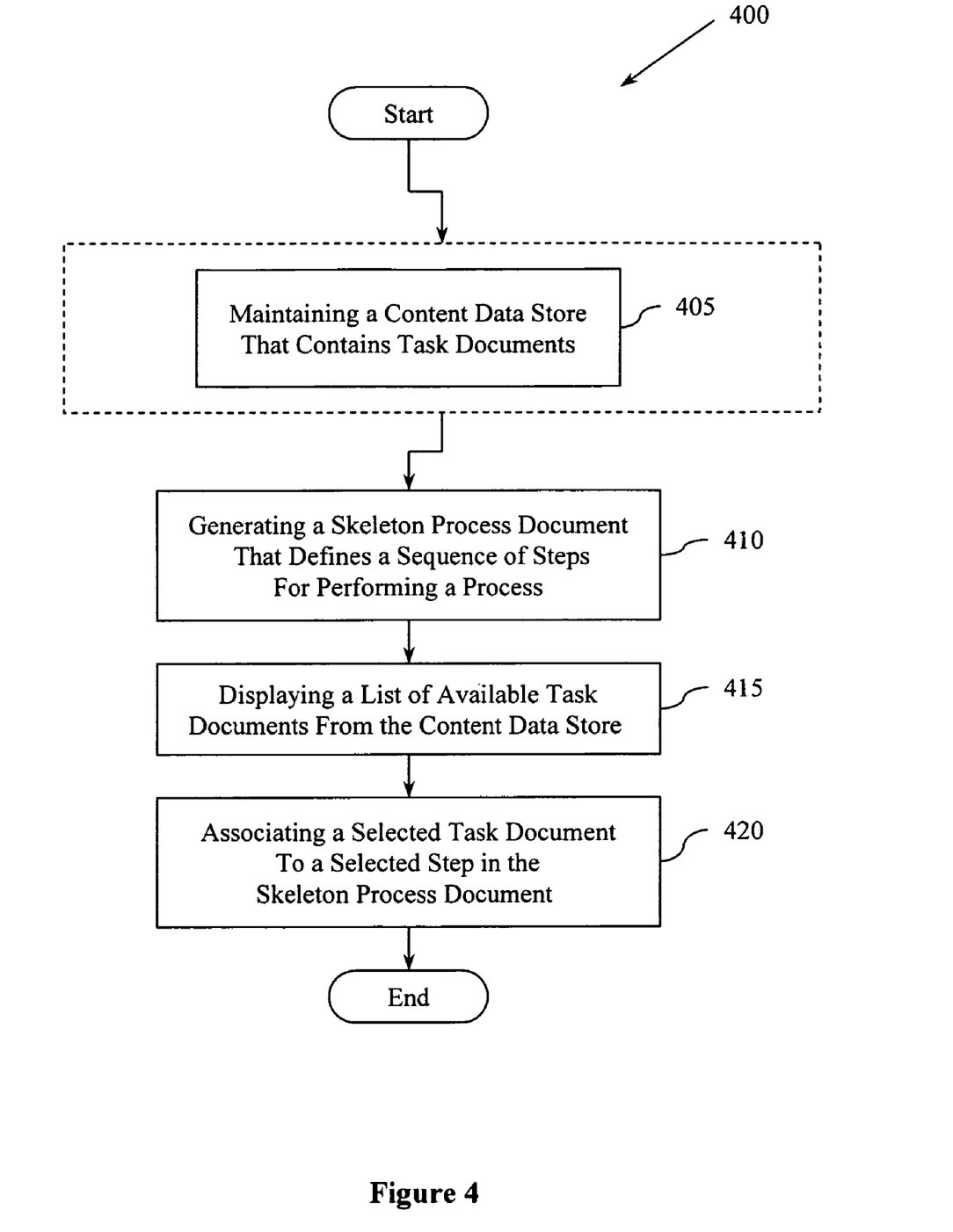
FIG. 4 illustrates an embodiment of a methodology that can be associated with configuring a process document to be dynamically generated.
Figure 5:
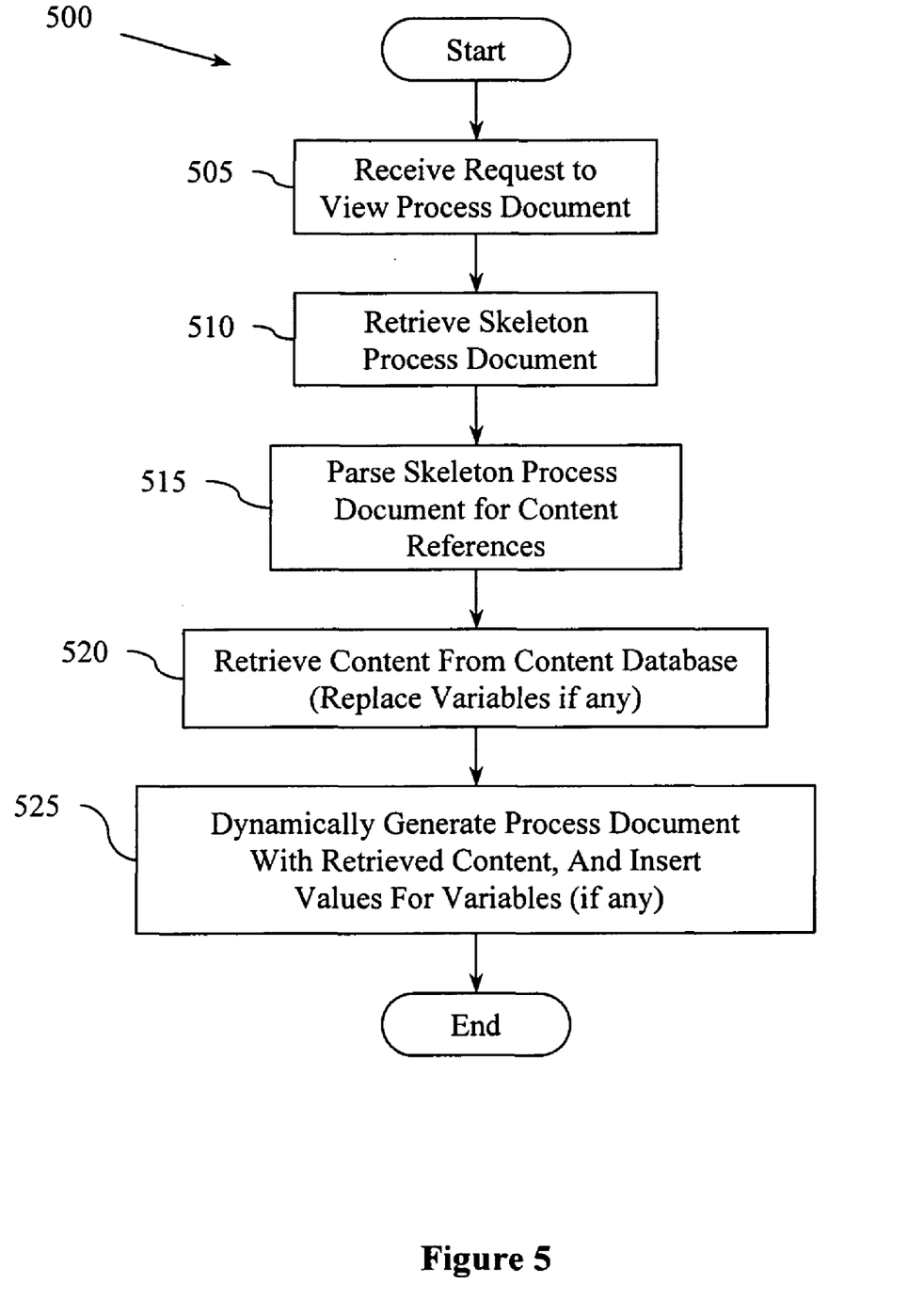
FIG. 5 illustrates one embodiment of an example methodology that can be associated with dynamically generating document.

Example methods may be better appreciated with reference to the flow diagrams of FIGS. 4-5. While for purposes of simplicity of explanation, the illustrated methodologies are shown and described as a series of blocks, it is to be appreciated that the methodologies are not limited by the order of the blocks, as some blocks can occur in different orders, occur at different times, and/or occur concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. In the case where the logic may be software, a flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software logic may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

Each methodology can be embodied by a computer-readable medium that provides processor-executable instructions that are operable with a computing device. The processor executable instructions can be configured to be operable to perform each respective methodology and its equivalents. The foregoing applies to all methodologies herein.

Illustrated in FIG. 4 is one embodiment of a methodology 400 that can be associated with configuring a process document to be capable of being dynamically generated. The methodology 400 can be a computer-implemented method. For example, the method 400 can include maintaining a content data store that contains task documents (Block 405). Each task document can provide instructions for a specific task and where combinations of task documents can be used as a sequence of steps for a desired process. It will be appreciated that blocks 405 can occur in parallel with and/or at different times than the remaining blocks in the method 400, which is the reason a dashed area outlines block 405.

For example, the remaining blocks would not be performed until initiated such as by receiving a request to generate a process document for a process. In response to receiving such a request, a skeleton process document can be generated that defines a sequence of steps for performing the process (Block 410). This may include, for example, enumerating steps like step 1, step 2, and so on. Since the skeleton document will not include the actual content for each step at this point, each step can be made to refer to its content. To assist in identifying content, a list of available task documents from the content data store can be displayed (Block 415). This may include displaying less than all the task documents. The list may also be displayed in response to a search request that identifies selected key words or the like that helps to narrow the available task documents based on subject matter or other user specified criteria.

A selected task document from the list can then be associated to a selected step in the skeleton process document (Block 420). By configuring the process document in this manner, the skeleton process document can be used to dynamically generate the process document by inserting content from the task documents associated to the sequence of steps in response to a request to view the process document.

The methodology 400, in another embodiment, can allow a selected task document to be modified. Since the task documents (e.g. content) are maintained as separate entities than the skeleton documents, a process document that includes the selected task document will be automatically updated with the modified task document when the process document is dynamically generated from the skeleton process document. Thus, the documentation for processes will be continuously updated automatically once they are generated.

Additionally, project variables that appear in the process document can be replaced with actual values for a particular project when a user views (e.g., dynamically generates) a process document. In this manner, the documentation can change its form depending on the project with which it is associated. This allows a skeleton document and its references to content to be used by multiple projects yet can be customizable with values that are unique to each project. For this purpose, the method 400 can also include generating a project instance as described previously. A project instance can include information related to a selected project that uses a selected skeleton process document. Multiple project instances can then be generated that use the same skeleton process document but with different values for variables (e.g. a different project instance for each different customer).

With reference to FIG. 5, one example embodiment of a methodology 500 is shown that can be associated with viewing a process document. The methodology 500 can apply to the system diagram shown in FIG. 3 but can also apply to other embodiments and their equivalents. The methodology 500 can initiate upon receiving a request to view a process document (Block 505). In response to the request, a skeleton process document is retrieved (Block 510). It will be appreciated that retrieving the skeleton document may simply include reading the contents from the skeleton document without actually retrieving a file. For this example, it will be assumed that the skeleton process document has been identified as being associated with the selected process and that the skeleton process document is configured with references to content.

The skeleton process document can then be parsed to identify the references to the content (Block 515). The content identified by the references can then be retrieved from, for example, a content database or data store (Block 520). If the content includes variables, the variables can be replaced with values if the values have been provided. A viewable process document can then be dynamically generated by inserting the content into the viewable process document to form a sequence of instructions for performing the selected process (Block 525).

Figure 6:
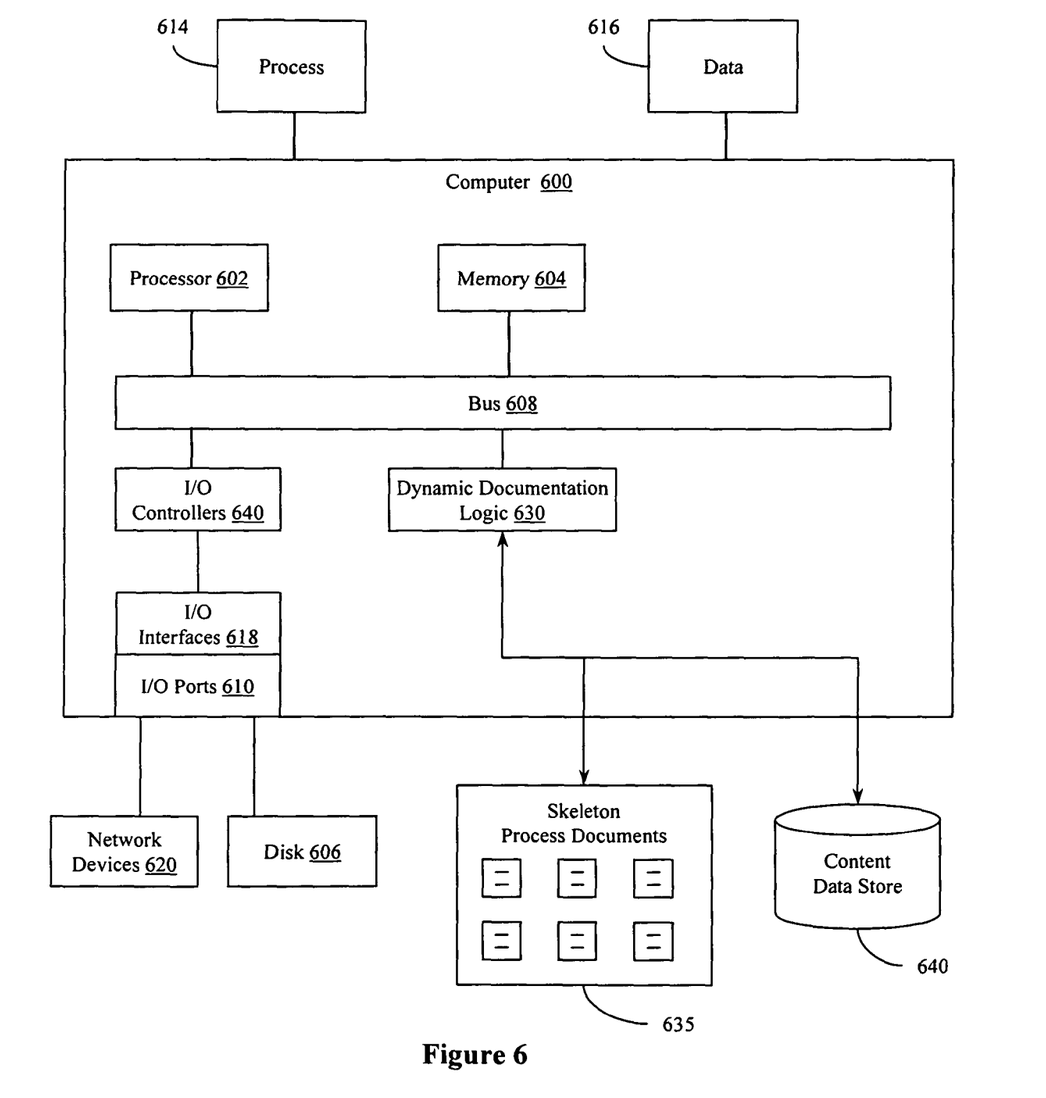
FIG. 6 illustrates an example computing environment in which example systems and methods illustrated herein can be implemented and/or can operate within.

FIG. 6 illustrates an example computing device in which example systems and methods described herein, and equivalents, can operate. The example computing device may be a computer 600 that includes a processor 602, a memory 604, and input/output ports 610 operably connected by a bus 608. In one example, the computer 600 may include a dynamic documentation logic 630 configured to facilitate dynamically generating documents as described in other embodiments. The dynamic documentation logic 630 can be implemented similar to the other example logics 100, 200 described in FIGS. 1 and 2, respectively, and/or the other systems and methods described. The dynamic documentation logic 630 can be configured to maintain and manipulate one or more skeleton process documents 635 and a content data store 640 as previously described, which may be local or on remote devices. The computer 600 can be an application server such as a J2EE server or other type of computing device. In one example, the content data store 640, as well as previously described data stores, can include a relational database.

Generally describing an example configuration of the computer 600, the processor 602 can be a variety of various processors including dual microprocessor and other multi-processor architectures. The memory 604 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices like a magnetic disk drive, a solid state disk drive, a floppy disk drive, a tape drive, a Zip drive, a flash memory card, and/or a memory stick. Furthermore, the disk 606 can include optical drives like a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 606 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via I/O interfaces 618 and input/output ports 610. Input/output devices can include, but are not limited to, a keyboard, a microphone, a pointing and selection device, cameras, video cards, displays, disk 606, network devices 620, and the like. The input/output ports 610 can include but are not limited to, serial ports, parallel ports, and USB ports.

The computer 600 can be configured to operate in a network environment and thus may be connected to network devices 620 via the I/O devices 618, and/or the I/O ports 610. Through the network devices 620, the computer 600 may establish a communication link and interact with a network.

Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11 and other versions), Bluetooth (IEEE 802.15.1 and other versions), radio frequency and/or cellular based protocols, and the like. Similarly, the network devices 620 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A dynamic documentation system, comprising:
   a processor; and
   a memory storing computer executable instructions that are executable by the processor and are configured to implement:
   a generating logic configured to generate a process document that describes a sequence of steps for performing a selected process where the process document is configured using:
   a skeleton document that includes a plurality of steps for performing the selected process, where the plurality of steps include references to task documents; and
   a plurality of task documents that are maintained separately from the skeleton document, where a task document includes instructions for performing a specific task that can be associated to a selected step; and
   a viewing logic configured to dynamically generate the process document in response to a request to view the process document by building the skeleton document with the task documents referenced within the skeleton document.

2. The system of claim 1, where the references to task documents include document identifiers that facilitate locating and retrieving task documents from a storage location.

3. The system of claim 1, wherein the system includes a non-transitory computer-readable medium configured with stored instructions that implement the generating logic and the viewing logic.

4. The system of claim 1 further including a web interface configured to allow a user to access the dynamic documentation system.

5. The system of claim 1 where one or more of the task documents include variables that can be dynamically configured; and
   where the viewing logic being configured to assign values to the variables in the task documents when dynamically generating the process document.

6. The system of claim 1 where the viewing logic includes:
   a parser configured to retrieved the references to task documents from the skeleton process document; and
   a builder logic configured to retrieve task documents identified by the references from the skeleton process document and combine the retrieved task documents with the skeleton process document to dynamically generate the process document.

7. The system of claim 1 where the viewing logic is configured to provide automatic updates to the process document where modifications to a task document are automatically applied to the process document upon viewing the process document.

8. The system of claim 1 where the system is an application server configured to dynamically generate process documents.

9. A non-transitory computer-readable medium for providing processor executable instructions operable to perform a method, the method comprising:
   receiving, by at least a processor, a request to view a process document that provides instructions for a selected process;
   retrieving a skeleton process document associated with the selected process, the skeleton process document being configured with references to content;
   parsing, by at least the processor, the skeleton process document to identify the references;
   retrieving the content identified by the references; and
   dynamically generating, by at least the processor, a viewable process document by inserting the content into the viewable process document to form a sequence of instructions for performing the selected process.

10. The non-transitory computer-readable medium of claim 9 where the request to view includes at least one of: a request to print, a request to display, and a request to transfer.

11. The non-transitory computer-readable medium of claim 9 further including replacing one or more variables that may be present in the content with values to facilitate customizing the viewable process document.

12. The non-transitory computer-readable medium of claim 9 further including generating the skeleton process documents to define a sequence of steps, where the sequence of steps includes the references to content.

13. The non-transitory computer-readable medium of claim 12 where the generating includes displaying a list of available content, and allowing a user to associate selected content with a step within the skeleton process document.

14. A computer-implemented method, comprising:
   maintaining a content data store in a non-transitory computer readable medium that contains task documents, where each task document provides instructions for a specific task and where combinations of task documents can be used as a sequence of steps for a desired process, where the task documents are configured to be shared by multiple process documents;

generating, by at least a processor, a skeleton process document that defines a sequence of steps for performing a process, displaying a list of available task documents from the content data store; and associating a selected task document from the list to a selected step in the skeleton process document;

where the skeleton process document can be used to dynamically generate a process document by inserting content from the task documents associated to the sequence of steps in response to a request to view the process document.

15. The computer-implemented method of claim 14 further including allowing a selected task document to be modified, where the process document that includes the selected task document is automatically updated with the modified task document when the process document is dynamically generated from the skeleton process document.

16. The computer-implemented method of claim 14 where the associating includes inserting a document identifier with the selected step where the document identifier can be used to identify a task document.

17. The computer-implemented method of claim 14 further including generating a project instance that includes information related to a selected project that uses a selected skeleton process document, where a multiple project instances can be generated that use the selected skeleton process document.

18. A system, comprising:

means for configuring an instructional document by defining a skeleton document having a plurality of step identifiers, where the step identifiers include references to instruction contents;

means for dynamically generating the instructional document in response to a request to view the instructional document, comprising:

means for retrieving the references to instruction contents from the skeleton document;

means for retrieving one or more instruction contents using the references; and means for generating the instructional document from the instruction contents.

19. A computer-implemented method, comprising:

configuring an instructional document, using at least a processor, by defining a skeleton document having a plurality of step identifiers, where the step identifiers include references to instruction contents;

generating, with at least the processor, the instructional document in response to a request to view the instructional document, wherein the generating comprises:

retrieving the references to instruction contents from the skeleton document; and retrieving one or more instruction contents using the references; and generating, with at least the processor, the instructional document from the instruction contents.

* * * * *

UNITED STATES PATENT AND TRADEMARK OFFICE
CERTIFICATE OF CORRECTION

PATENT NO. : 8,312,368 B2
APPLICATION NO. : 11/030247
DATED : November 13, 2012
INVENTOR(S) : Swamidass Page 1 of 1

It is certified that error appears in the above-identified patent and that said Letters Patent is hereby corrected as shown below:

In column 3, line 56, delete "servelet," and insert -- servlet, --, therefor.

Signed and Sealed this
Fifth Day of February, 2013

Teresa Stanek Rea
*Acting Director of the United States Patent and Trademark Office*